United States Patent
Djakovic

(10) Patent No.: US 12,506,714 B2
(45) Date of Patent: Dec. 23, 2025

(54) SYSTEMS AND METHODS FOR SECURE COMMUNICATION OVER A NETWORK USING A LINKING ADDRESS

(71) Applicant: Hubbell Incorporated (Delaware), Shelton, CT (US)

(72) Inventor: Vladan Djakovic, San Francisco, CA (US)

(73) Assignee: Hubbell Incorporated, Shelton, CT (US)

(*) Notice: Subject to any disclaimer, the term of this patent is extended or adjusted under 35 U.S.C. 154(b) by 0 days.

(21) Appl. No.: 17/843,466

(22) Filed: Jun. 17, 2022

(65) Prior Publication Data

US 2022/0321543 A1 Oct. 6, 2022

Related U.S. Application Data

(63) Continuation of application No. 14/728,867, filed on Jun. 2, 2015, now abandoned.
(Continued)

(51) Int. Cl.
*H04L 9/40* (2022.01)
*H04L 61/5092* (2022.01)

(52) U.S. Cl.
CPC ...... *H04L 63/0428* (2013.01); *H04L 61/5092* (2022.05); *H04L 63/0823* (2013.01); *H04L 63/10* (2013.01)

(58) Field of Classification Search
CPC . H04L 61/20; H04L 61/2007; H04L 61/2038; H04L 61/2084; H04L 61/2092;
(Continued)

(56) References Cited

U.S. PATENT DOCUMENTS 5,500,860 A 3/1996 Perlman et al.
6,108,644 A 8/2000 Goldschlag et al.
(Continued)

FOREIGN PATENT DOCUMENTS

CN 102891891 1/2013
CN 102984120 3/2013
(Continued)

OTHER PUBLICATIONS

Namiot et al. "On Mobile Bluetooth Tags," Conference of Open Innovations Association FRUCT, Apr. 1, 2015, pp. 325-330.
(Continued)

*Primary Examiner* — Zachary A. Davis
(74) *Attorney, Agent, or Firm* — Robinson + Cole LLP

(57) ABSTRACT

Systems and methods for secure communication over a network using a linking address are disclosed. Systems for secure communication may include: a computer system in electronic communication over a network with a plurality of electronic devices; a database in electronic communication with the computer system, the database configured to electronically store at least a linking address and an associated payload of a data packet; and an engine stored on and executed by the computer system, the engine electronically receiving a data packet over the network from a first electronic device; processing the data packet to identify a linking address and a payload, the linking address being at least 32 bit; storing the linking address and payload in the database; electronically receiving a query from a second electronic device, the second electronic device identifying the linking address; and electronically transmitting the data packet over the network to the second electronic device.

20 Claims, 8 Drawing Sheets

Related U.S. Application Data

(60) Provisional application No. 61/997,450, filed on Jun. 2, 2014, provisional application No. 61/997,422, filed on Jun. 2, 2014.

(58) Field of Classification Search
CPC . H04L 61/2521; H04L 61/2503; H04L 61/25; H04L 63/0428
See application file for complete search history.

(56) References Cited

U.S. PATENT DOCUMENTS

| | | |
|---|---|---|
| 6,636,516 B1 | 10/2003 | Yamano |
| 6,917,978 B1 | 7/2005 | Jinzaki |
| 6,944,154 B2 | 9/2005 | Coupe et al. |
| 7,472,277 B2 * | 12/2008 | Halcrow ............ H04L 63/0823 713/176 |
| 7,558,604 B2 | 7/2009 | Narayanaswami et al. |
| 7,626,576 B2 | 12/2009 | Anandakumar |
| 7,760,693 B2 | 7/2010 | Akiyoshi |
| 7,965,638 B1 | 6/2011 | Schzukin et al. |
| 7,990,967 B2 * | 8/2011 | Brandt ................... H04L 63/10 370/392 |
| 8,010,496 B2 | 8/2011 | Okada et al. |
| 8,040,901 B1 | 10/2011 | Kompella et al. |
| 8,806,033 B1 | 8/2014 | Vinapamula Venkata et al. |
| 9,143,890 B2 | 9/2015 | Jose et al. |
| 9,204,263 B2 | 12/2015 | Lindner et al. |
| 9,276,769 B2 | 3/2016 | Hsiao |
| 9,372,922 B2 | 6/2016 | Shaashua |
| 9,634,889 B2 | 4/2017 | Gu et al. |
| 10,154,017 B2 | 12/2018 | Lancioni et al. |
| 10,693,714 B2 | 6/2020 | Teo et al. |
| 2005/0114505 A1 * | 5/2005 | DeStefano .......... H04L 63/1416 709/224 |
| 2008/0175379 A1 | 7/2008 | Hansen et al. |
| 2010/0235481 A1 * | 9/2010 | Deutsch .............. H04L 41/0806 709/227 |
| 2013/0227653 A1 | 8/2013 | Choi |
| 2014/0052984 A1 | 2/2014 | Gupta |
| 2014/0089671 A1 | 3/2014 | Logue et al. |
| 2014/0108943 A1 | 4/2014 | Lee et al. |
| 2014/0219281 A1 | 8/2014 | Awano |
| 2015/0318874 A1 | 11/2015 | Donaldson |
| 2015/0347511 A1 | 12/2015 | Schmidt et al. |
| 2016/0028699 A1 | 1/2016 | Ambroz et al. |
| 2016/0100014 A1 * | 4/2016 | Hsieh ................. G06F 3/04847 709/208 |
| 2017/0156076 A1 | 6/2017 | Eom et al. |

FOREIGN PATENT DOCUMENTS

| | | |
|---|---|---|
| CN | 103067340 | 4/2013 |
| CN | 103118048 | 5/2013 |
| CN | 103259859 | 8/2013 |
| CN | 104298203 | 1/2015 |
| JP | 2005184322 A | 7/2005 |
| JP | 2009164901 A | 7/2009 |
| JP | 2011501624 A | 1/2011 |
| JP | 2015170286 A | 9/2015 |
| JP | 2016500210 A | 1/2016 |
| WO | 200041529 A2 | 7/2000 |
| WO | 2013095753 A1 | 6/2013 |

OTHER PUBLICATIONS

Suomalainen, "Smartphone Assisted Security Pairing for the Internet of Things," 2014 4th International Conference on Wireless Communications, Vehicular Technology, Information Theory and Aerospace & Electronic Systems (VITAE), Abstract only, May 11-14, 2014, Aalborg, Denmark—2 pages.
Li, "Design of a Key Establishment Protocol for Smart Home Energy Management System," 2013 Fifth International Conference on Computational Intelligence, Communication Systems and Networks, ABSTRACT only, Jun. 5-7, 2013, Madrid, Spain—2 pages.
Anonymous, "Hypertext Transfer Protocol," Wikipedia, last modified on May 14, 2014—11 pages.
Legare, "Designing for IoT—Part IV—The Cloud," Mar. 25, 2014—7 pages.
Vixie et al., "Dynamic Updates in the Domain Name System (DNS Update)", IETF, Apr. 1, 1997—26 pages.
Supplementary European Search Report for corresponding EP Application No. 15803480.1, dated Feb. 14, 2018—9 pages.
International Search Report and Written Opinion for International Application No. PCT/US2015/33816 mailed on Sep. 4, 2015. 16 pages.

* cited by examiner

SYSTEMS AND METHODS FOR SECURE COMMUNICATION OVER A NETWORK USING A LINKING ADDRESS

RELATED APPLICATIONS

This application claims the benefit of U.S. patent application Ser. No. 14/728,867, filed Jun. 2, 2015, U.S. Provisional Patent Application No. 61/997,422, filed Jun. 2, 2014, and U.S. Provisional Patent Application No. 61/997,450, filed Jun. 2, 2014, the entire contents of which are hereby incorporated by reference.

FIELD OF THE DISCLOSURE

The present disclosure relates generally to systems and methods for secure communication over a network using a linking address. More specifically, the present disclosure relates to a system and method for secure transmission and storage over a network using one of many linking addresses.

RELATED ART

There are a growing number of electronic devices in communication over the Internet, which together comprise the Internet of Things (IoT). A difficulty of having so many devices in communication over the Internet is providing an efficient, effective, reliable, and scalable way to directly connect all of these devices with one another. Many electronic devices connect to the Internet through various firewalls and routers using a Network Address Translation (NAT) protocol. Communication via NAT does not directly expose the communicating device to the external network environment, which can be problematic when such devices are trying to communicate directly (e.g., when the devices are not connected to servers that have their Internet address exposed).

The Interactive Connectivity Establishment (ICE) protocol (e.g., with Session Traversal Utilities for NAT (STUN)) can be used to assist the direct connection of devices, but this approach does not work in every case (e.g., in 10% of cases). Alternatively, a relaying service could be used (e.g., Traversal Using Relays around NAT (TURN)), which is more reliable, but requires the relaying service to be a trusted party (e.g., to know its individual clients as well as store permissions and session states).

These approaches can result in service fragmentation, as each group of devices (e.g., grouped by vendor, provider, ownership, etc.) has its own connectivity provider due to the required trust relationship. Another disadvantage of these approaches is an increased cost of servicing, as there are substantial resources required on the server side (e.g., processing power, memory, etc.) because reliable connections are stateful.

Further, many systems and devices create periodic or event-driven historical records (e.g., logs) to be stored for subsequent retrieval and analysis. Many available log storage mechanisms form a closed system with mutual trust between the storage mechanism, log generator, and consumer. However, requiring every system to have its own log storage mechanism can be problematic when log generators and consumers are owned by various parties, when it is unknown who the log consumer will be, when there are multiple log consumers, etc. Further, coupling security associations and trust relationships with the log storage mechanism increases the amount of security associations and procedures to set up and maintain. It is impractical for every analytic application to create its own log storage mechanism, or have each device model commit to one particular log storage mechanism at the time of manufacture.

All these problems are exacerbated as the number of clients (e.g., electronic devices, device owners, etc.) increase, such as in an IoT environment.

SUMMARY OF THE INVENTION

In view of the above, there is a need for a system that can provide secure electronic communication and storage over a network that is scalable and reliable, and which uses minimal computer resources and minimal financial resources to setup, maintain, and use.

The present disclosure relates to systems and methods for secure communication over a network using a linking address. In one embodiment, the system for secure communication comprises: a computer system in electronic communication over a network with a plurality of electronic devices; a database in electronic communication with the computer system, the database configured to electronically store at least a linking address and an associated payload of a data packet; and an engine stored on and executed by the computer system, the engine electronically receiving a data packet over the network from a first electronic device; processing the data packet to identify a linking address and a payload, the linking address being at least 32 bit; storing the linking address and payload in the database; electronically receiving a query from a second electronic device, the second electronic device identifying the linking address; and electronically transmitting the data packet over the network to the second electronic device.

In another embodiment, a method for secure communication comprises electronically receiving, at an engine stored on and executed by a computer system, a data packet from a first electronic device over a network, processing the data packet to identify a linking address and a payload contained therein, the linking address being at least 32 bit, storing the linking address and the associated payload of the data packet in a database, electronically receiving a query from a second electronic device, the second electronic device identifying the linking address, and electronically transmitting the data packet over the network to the second electronic device.

BRIEF DESCRIPTION OF THE DRAWINGS

The foregoing features of the disclosure will be apparent from the following Detailed Description, taken in connection with the accompanying drawings, in which.

DETAILED DESCRIPTION

The present disclosure relates to a system and method for secure electronic communication and storage over a network. More specifically, the present disclosure relates to an Internet of Things/Internet Protocol (IoT/IP) system to provide secure electronic communication and storage over a network. The IoT/IP system is scalable, reliable, and secure, and uses minimal computer resources (e.g., processing power, memory, etc.) and minimal financial resources to setup, maintain, and use. As a result of using fewer computer resources, the IoT/IP system also improves the functioning of the computer itself, among other advantages. The IoT/IP system provides for secure communication (e.g., electronic transmissions) as well as secure storage (e.g., log storage) by using a unique linking address (e.g., key, pin, token, ID, etc.), where the linking address is one of a very large number of possible linking addresses (e.g., trillions). In other words, the number of linking addresses in use (e.g., by electronic devices) is much less than the number of linking addresses available. This makes the linking address being used impractical (unlikely) to guess or deduce, even using a computerized random address generator. For example, the linking address may be as large or larger than 32 bit, 64 bit, 128 bit, 256 bit, 512 bit, etc. If the ID is 128 bits, the collision probability after 20 trillion pairings is one in a trillion, so the probability of guessing or deducing the relevant active ID (if a trillion logs are simultaneously active) is 1 in $10^{26}$. Accordingly, the IoT/IP system does not require or use any security associations.

Figure 1:
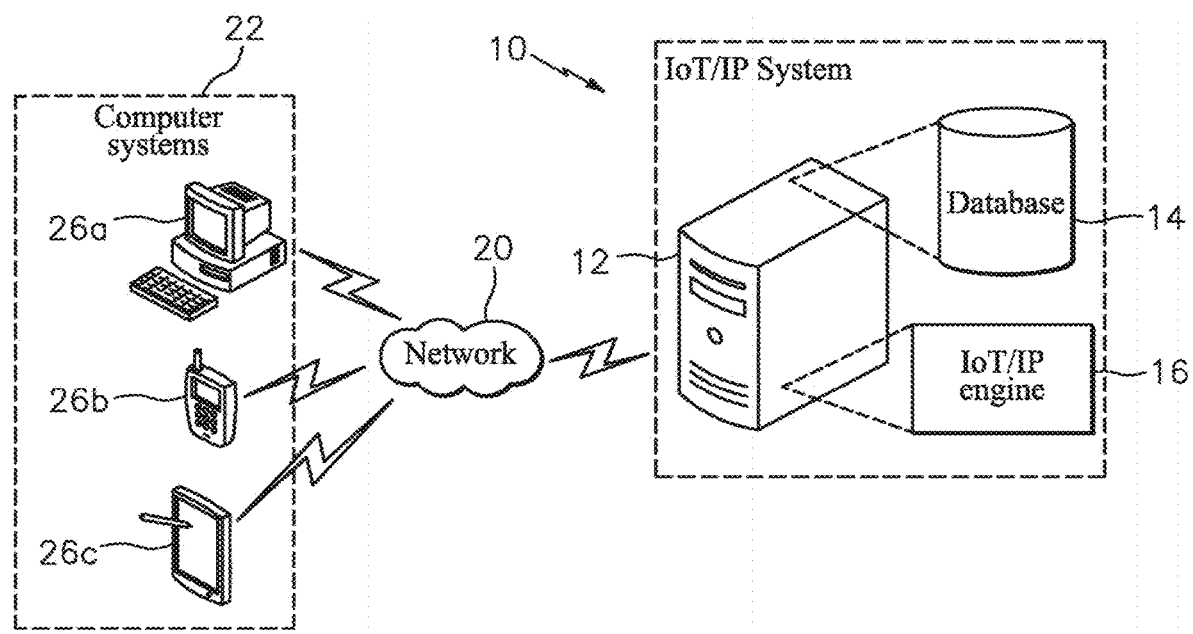
FIG. 1 is a diagram showing an IoT/IP system for secure electronic communication and storage over a network.

FIG. 1 is a diagram showing an exemplary IoT/IP system for secure electronic communication and storage over a network, indicated generally at 10. The IoT/IP system 10 comprises a computer system 12 (e.g., a server, multiple servers) having a database 14 stored therein or operatively connected thereto and an IoT/IP engine 16. The computer system 12 may be any suitable computer server (e.g., a server with an INTEL microprocessor, multiple processors, multiple processing cores, etc.) running any suitable operating system (e.g., WINDOWS by Microsoft, LINUX, etc.). The database 14 may be stored on the computer system 12, or located externally therefrom (e.g., in a separate database server in communication with the IoT/IP system 10). The IoT/IP system 10 is remotely accessible such that the IoT/IP system 10 communicates through a network 20 with one or more of a variety of computer systems 22 (e.g., personal computer system 26a, a smart cellular telephone 26b, a tablet computer 26c, and/or other electronic devices). Network communication may be over the Internet using standard TCP/IP communications protocols (e.g., hypertext transfer protocol (HTTP), secure HTTP (HTTPS), file transfer protocol (FTP), electronic data interchange (EDI), etc.), through a private network connection (e.g., wide-area network (WAN) connection, emails, electronic data interchange (EDI) messages, extensible markup language (XML) messages, file transfer protocol (FTP) file transfers, etc.), or any other suitable wired or wireless electronic communications format and system.

Figure 2:
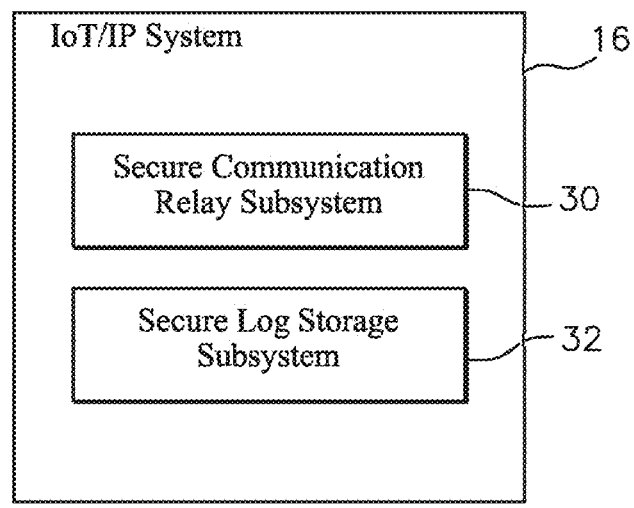
FIG. 2 is a diagram illustrating subsystems of the IoT/IP engine.

FIG. 2 is a diagram illustrating exemplary subsystems of the IoT/IP engine 16. These include a secure communication relay subsystem 30 and a secure log storage subsystem 32. The secure communication relay subsystem 30 provides anonymous relaying (e.g., in real time) of secure communications between two (or more) electronic devices over a network by utilizing a unique linking address (e.g., previously agreed upon). More specifically, the linking address for the secure communication relay subsystem 30 may be a Remote Conduit Identification (RCID). As mentioned above, the predetermined RCID is so complex (e.g., large) as to be impractical to guess or determine, and the number of unique RCIDs available is much larger than the actual number in use. The secure communication relay subsystem 30 is completely indifferent (e.g., agnostic) to the identities of the electronic devices and the content of the data packet (e.g., electronic communication) being transmitted.

The secure log storage subsystem 32 provides anonymous storage of log entries any other type of data) generated from a first log generator electronic device, which can then be accessed by one or more second log consumer electronic devices by using a linking address. The first log generator electronic device may be the same device as the second log consumer electronic device. More specifically, the linking address for the secure log storage subsystem 32 may be a Remote Storage Identification (RSID). The log generator electronic device may transmit log entries to a single RSID, which then may be accessed by one or more log consumer electronic devices. Alternatively, the log generator electronic device may transmit log entries to multiple RSIDs, such that each linking address is exclusive to only one log consumer electronic device. As with the secure communication relay subsystem 30, the RSID is so complex (e.g., large) as to be impractical to guess or deduce the one being used, and the number of unique RSIDs available is much larger than the actual number in use. The secure log storage subsystem 32 is completely indifferent (e.g., agnostic) as to the identities of the electronic devices and the content of the data packet (e.g., log entries) being transmitted and stored. Although log entries are described, the secure log storage subsystem 32 may store any type of electronic data.

The IoT/IP system does not store any confidential information or client information (e.g., registration information, configuration information, hardware address information, etc.), and thus the server of the IoT/IP system does not require protection. In other words, the IoT/IP system (e.g., including each of the secure communication relay subsystem 30 and the secure log storage subsystem 32) has no knowledge of the electronic devices communicating therewith, nor does the IoT/IP system have any knowledge of any security associations of such devices. As a result, the IoT/IP system operates at a very low financial cost and uses minimal computer resources, thereby improving the functioning (e.g., speed) of the computer system of the IoT/IP system. The IoT/IP system does not require any information or knowledge of any of the electronic devices prior to those devices using the system, thereby avoiding costly authentication systems and procedures (e.g., logins, accounts, etc.). This provides a connectivity infrastructure between many devices (e.g., millions of devices) without any preparation steps and without communicating individual device information.

Figure 3:
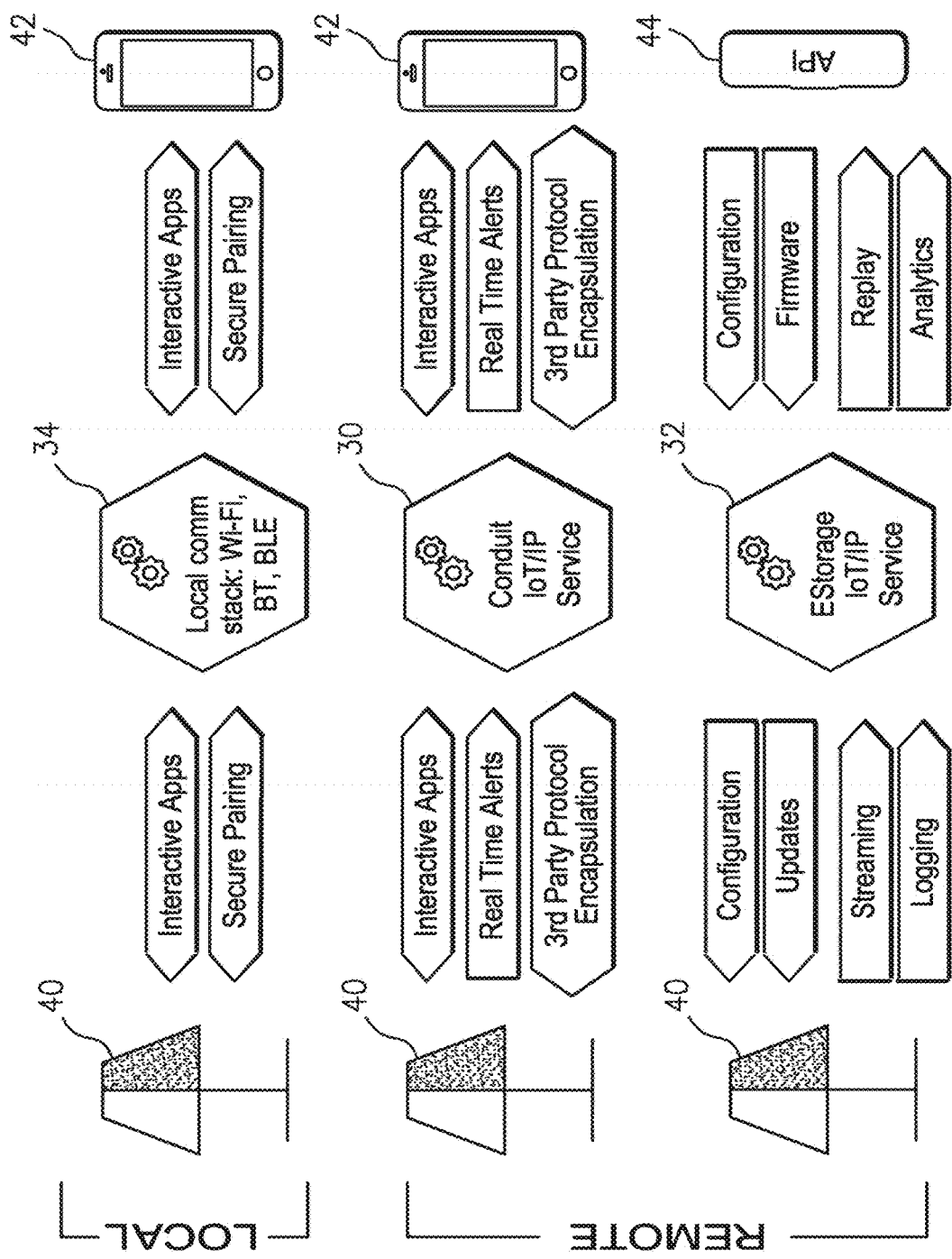
FIG. 3 is a diagram illustrating electronic communication of an electronic device using the IoT/IP system.

FIG. 3 is a diagram illustrating an example of electronic communication of an electronic device using the IoT/IP system. More specifically, a first electronic device (e.g., smartlamp 40) communicates locally (e.g., BLUETOOTH, BLUETOOTH low energy, WI-FI) with a second electronic device (e.g., smartphone 42) using a local communication stack 34 to securely pair the two devices together (e.g., locally authenticate the two devices). During this secure pairing, the two electronic devices agree upon one or more unique linking addresses (e.g., RCID and/or RSID). However, the devices may be securely paired in any of a variety of alternative ways. Once a linking address is agreed upon, the two electronic devices (e.g., smartlamp 40 and smartphone 42) can communicate with each other remotely over the Internet using the linking address. More specifically, the smartlamp 40 can transmit a data packet (e.g., communication) to the predetermined RCID of the secure communication relay subsystem 30 (e.g., conduit IoT/IP service). The smartphone 42 can then retrieve the data packet from the secure communication relay subsystem 30 using the RCID (e.g., for real time alerts). The smartlamp 40 can also send (e.g., stream) data packet(s) (e.g., log entry) to the RSID of the secure log storage subsystem 32 (e.g., EStorage IoT/IP service), which stores the data packet at that RSID until subsequently retrieved at a later time, such as by an application programming interface (API) 44 of an electronic device. Though the example of FIG. 3 is shown as being a wireless communications system, any suitable communications system, wireless or wired, may be used.

Figure 4:
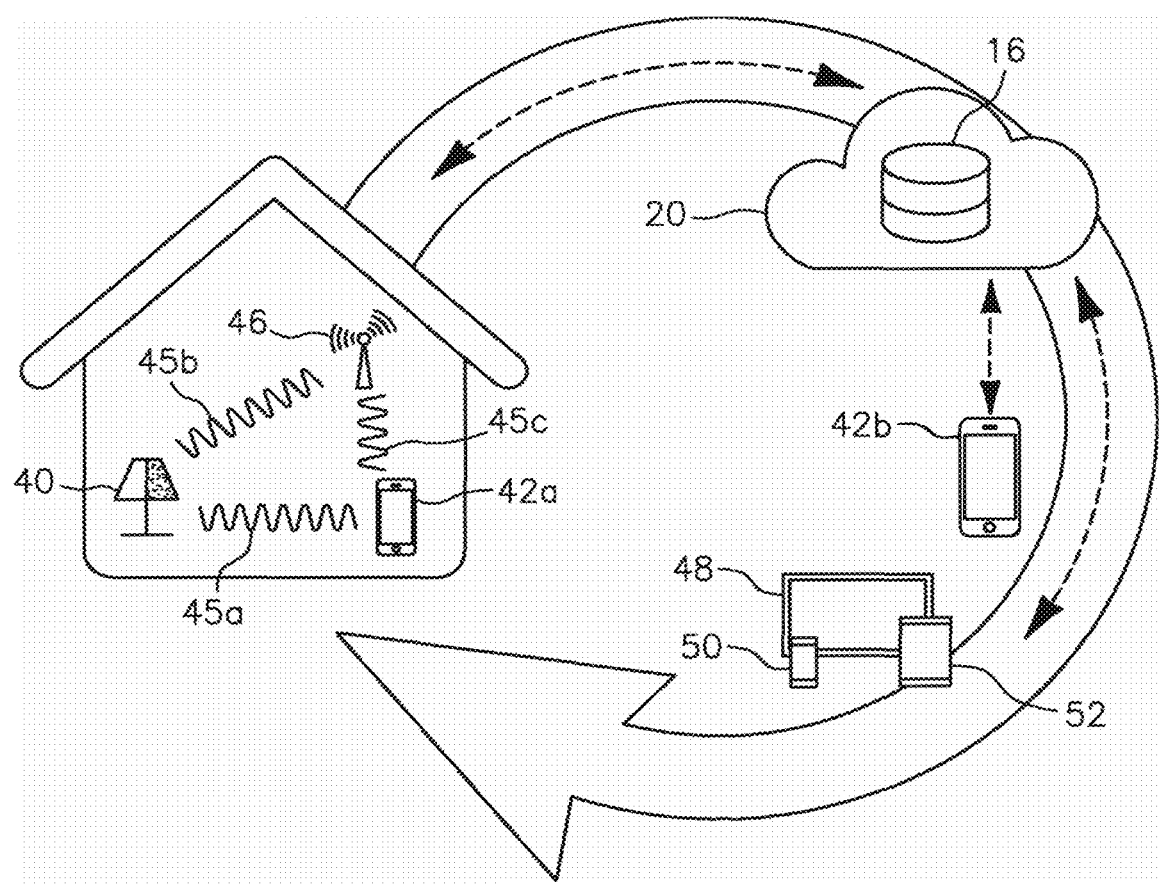
FIG. 4 is a diagram illustrating use of the IoT/IP system across multiple electronic devices.

FIG. 4 is a diagram illustrating an exemplary use of an IoT/IP system across multiple electronic devices. As shown, and as described above, a first electronic device (e.g., smartlamp 40) communicates locally via a transmitter (e.g., using BLUETOOTH, BLUETOOTH low energy, WI-FI, etc.) with one or more second electronic devices (e.g., local smartphone 42a, local router 46, etc.). More specifically, for example, a smartlamp 40 may communicate locally via the transmitter over a first (wired or wireless) communication link 45a with a smartphone 42a (e.g., to agree on the RCID), the smartlamp 40 may also communicate with a router 46 over a second (wired or wireless) communication link 45b, and the smartphone 42a may communicate with the router 46 over a third (wired or wireless) communication link 45c. Accordingly, the smartlamp 40, smartphone 42a and router 46 are authenticated with one another as trusted devices.

Once locally authenticated, the devices will be able to directly communicate with each other remotely over the Internet 20 via the IoT/IP system. For example, a remote smartphone 42b (which may be a different or the same smartphone as smartphone 42a when remotely located) may communicate with the IoT/IP engine 16 which communicates with the smartlamp 40 via the local router 46. The system is completely indifferent to the local electronic communication protocol used (e.g., indifferent to NAT protocol). Any number or any type of electronic devices may be used and paired with one another (e.g., smartlamp 40, desktop computer 48, smartphone 50, tablet computer 52, laptop computer, thermostat, lightswitch, electrical socket, garage door opener, etc.) to remotely communicate with each other via the IoT/IP engine 16. From the user perspective, the devices (e.g., smartlamp 40 and smartphone 42a) may directly communicate with each other locally (e.g., using BLUETOOTH, etc.) to determine an agreed upon linking address, and then communicate with one another remotely over the network 20 (e.g., smartlamp 40 and smartphone 42b) using the predetermined linking address. From the user perspective, the devices communicate and operate with one another the same when locally communicating as they do when remotely communicating without any need for online registration (e.g., of the user, the device hardware, and/or any other identifying information). Further, the system may utilize forward secrecy such that if an unauthorized user were to break into the device and/or the IoT/IP system, they would not be able to reconstruct past communications.

Figure 5:
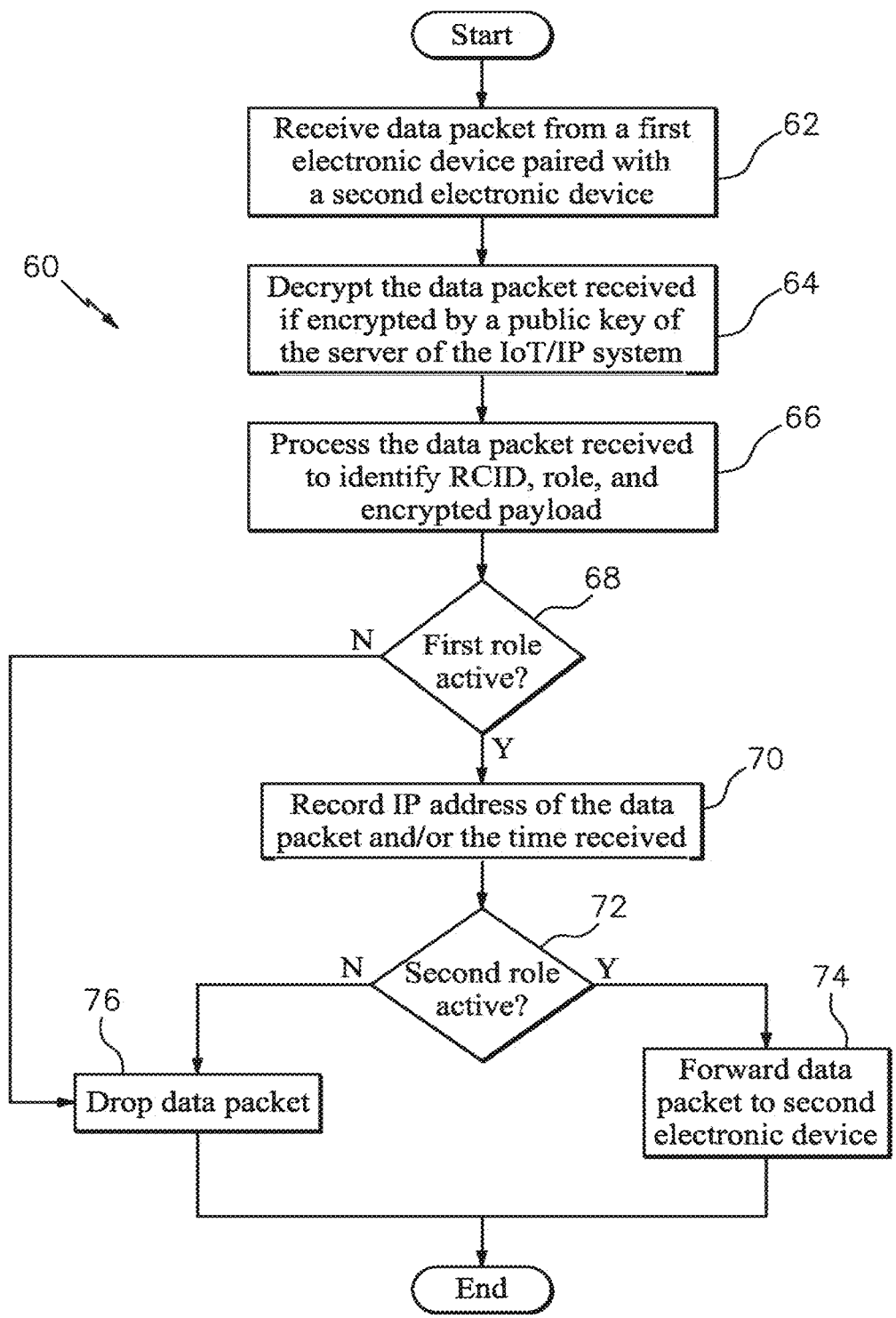
FIG. 5 illustrates processing steps of the secure communication relay subsystem of the IoT/IP system.

FIG. 5 illustrates processing steps 60 of a secure communication relay subsystem of an exemplary IoT/IP system. In step 62, the IoT/IP system receives over a network a data packet (e.g., packet, message, communication, record, etc.) from a first electronic device (e.g., Device A, Device 1, etc.) paired (e.g., synced, authenticated) with a second electronic device (e.g., Device B, Device 2, etc.). The first electronic device and second electronic device are paired such that the devices agree on a Remote Conduit identification (RCID) (e.g., linking address) and role identifiers (e.g., roles) to distinguish between themselves (e.g., A and B, 1 and 2, etc.). The RCID in various embodiments exists in a very sparse name space and could be a random token, number, a word, a passphrase, a symbol, etc. If an RCID of sufficient complexity (e.g., size, variability, etc.) is used, it will be impractical to guess or deduce the specific RCID being utilized. For example, the RCID may be a token of 128 bits. The two electronic devices could be paired together (e.g., and agree on a common RCID) in any of a variety of suitable ways. For example, the two electronic devices could communicate directly with one another (e.g., using BLUETOOTH, WI-FI, etc.), the two electronic devices could be packaged and sold together such that the devices have been preprogrammed with the common ROD by the manufacturer, and/or the two electronic devices could be registered with a website that syncs the two devices together. Alternatively, a user could manually enter an RCID in each of the devices and/or manually enter a unique passphrase (e.g., word, sentence, etc.) that is processed by a preprogrammed mathematical algorithm to correlate with a RCID (e.g., entering the passphrase on each device gets processed by the same algorithm so that each device independently comes up with the same RCID). The two electronic device may also have established credentials (e.g., shared secrets) that enable secure communication over insecure channels, More specifically, such established credentials enable end-to-end encryption between the devices to protect communications from the IoT/IP system and/or anyone else. In step 64, the IoT/IP system decrypts the data packet if encrypted by a public key of the server of the IoT/IP system. Data packet encryption hides the RCID from observers and prevents interference by third parties (e.g., prevents third parties from learning the RCID). To encrypt the data packet, any of the existing public key schemes can be used (e.g., RSA, Diffie-Hellman (DH) (establishing a one-time shared secret by a public key method), elliptic curve cryptography (ECC), etc). However, as discussed above, the IoT/IP system does not require security associations. Particularly for data packets with end-to-end encryption and authentication with pre-established credentials, securing electronic communication (e.g., traffic) between clients and the IoT/IP system is not required. Encrypting the RCID with the public key of the IoT/IP server and using sparse ID name space ensures that attackers cannot insert malicious traffic or log entries, or pose as legitimate users, thereby preventing targeted denial of service (DoS) attacks and snooping. In step 66, the IoT/IP system then processes the data packet received to identify the RCID, role identifier (e.g., A or B, 1 or 2, etc.), and payload (e.g., encrypted payload). In step 68, the IoT/IP system determines whether the first role is active. Each electronic device (e.g., a first electronic device and a second electronic device) can establish an active status of a role of an RCID with the IoT/IP system (e.g., the server), such as by electronically transmitting an open channel request to the IoT/IP system (e.g., before or with electronic transmission of a data packet). The open channel request could include the RCID, the role, and/or credentials (e.g., a unique blinded certificate) to validate with the IoT/IP system to confirm that the electronic device is authorized to use the IoT/IP system. Once the IoT/IP system validates the open channel request (e.g., including the credentials), the IoT/IP system declares the status of the role (e.g., the first role) of the RCID as active. Once the electronic device establishes an active status of a role of an RCID, the IoT/IP system could record the time the open channel request was received and start a timer. Once a predetermined time period has expired (e.g., two minutes, five minutes, etc.), the IoT/IP system removes the active status (e.g., changes the status of the role to inactive) unless the electronic device maintains the active status. The electronic device can maintain the active status and reset the timer by resubmitting an open channel request with credentials) or by successfully transmitting a data packet to a second electronic device as described below. If the first role is not active (e.g., inactive), then the system proceeds to step 76 and drops the data packet. If the first role is active, then in step 70, the IoT/IP system records the IP address of the data packet and/or the time received in the database. In step 72, the IoT/IP system determines whether the second role (e.g., a second electronic device) is active. If so, in step 74, the IoT/IP system forwards the data packet (with the encrypted payload) to the second electronic device. The IoT/IP system in some embodiments encrypts the data packet for transmission to the second electronic device. If not, in step 76, the system drops the data packet. Once received, the second electronic device can then decrypt both the encrypted packet (if encrypted) and the encrypted payload (if encrypted). In this way, the IoT/IP system acts as a relay between the first electronic device and the second electronic device. The IoT/IP system is completely indifferent (e.g., agnostic) as to the identity of the electronic devices, the content of the encrypted payload, the identity of the owner of one or both of the electronic devices, etc. However, because the RCID is so large, the IoT/IP system provides the privacy and security necessary for electronic communications over a network.

Figure 6:
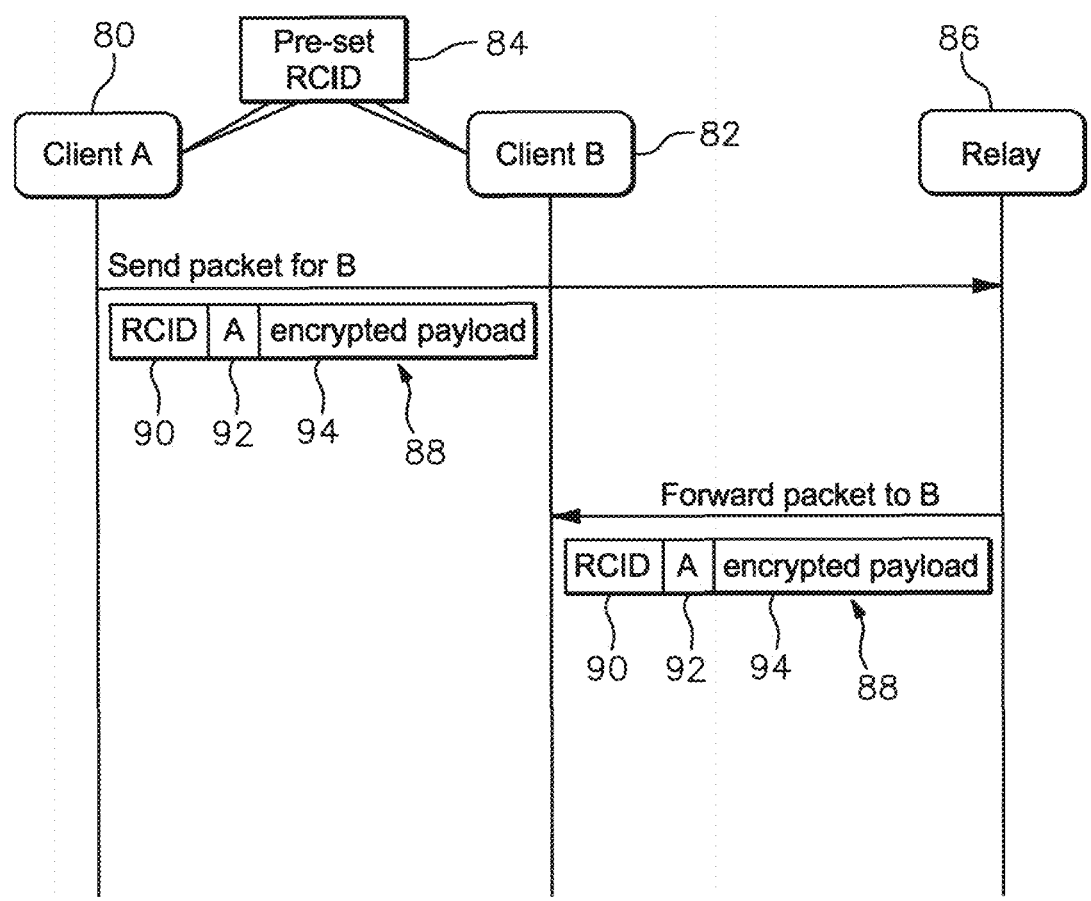
FIG. 6 is a diagram illustrating the processing steps of FIG. 5.

FIG. 6 is a diagram illustrating exemplary processing steps of FIG. 5. More specifically, as shown, Client A 80 (e.g., first electronic device) and Client B 82 are securely paired such that they agree upon a preset RCID 84. Client A 80 then sends a data packet 88 for Client B 82 over the network to the relay 86 (e.g., the IoT/IP system). The data packet 88 includes the RCID 90 (e.g, the same as preset RCID 84), the role identifier 92 of the sending client (e.g., A if sent from Client A 80, B if sent from Client B 82), and an encrypted payload 94, though as noted above in other embodiments the payload is not encrypted. The relay 86 receives the data packet 88 from Client A 80 and then decrypts the data packet 88 to reveal the RCID 90, the role identifier 82, and the still encrypted payload 94 (which step is not performed if the packet is not encrypted). Client B 82 retrieves the data packet 88 from the relay 86 using the preset RCID 84, and then decrypts data packet 88 and the encrypted payload 94. The relay 86 in some embodiments encrypts the data packet 88 for transmission to Client B 82. In some such embodiments, the encrypted payload 94 of the data packet 88 is never decrypted by the relay 86. The relay 86 only provides data packet decryption, not payload decryption.

Figure 7:
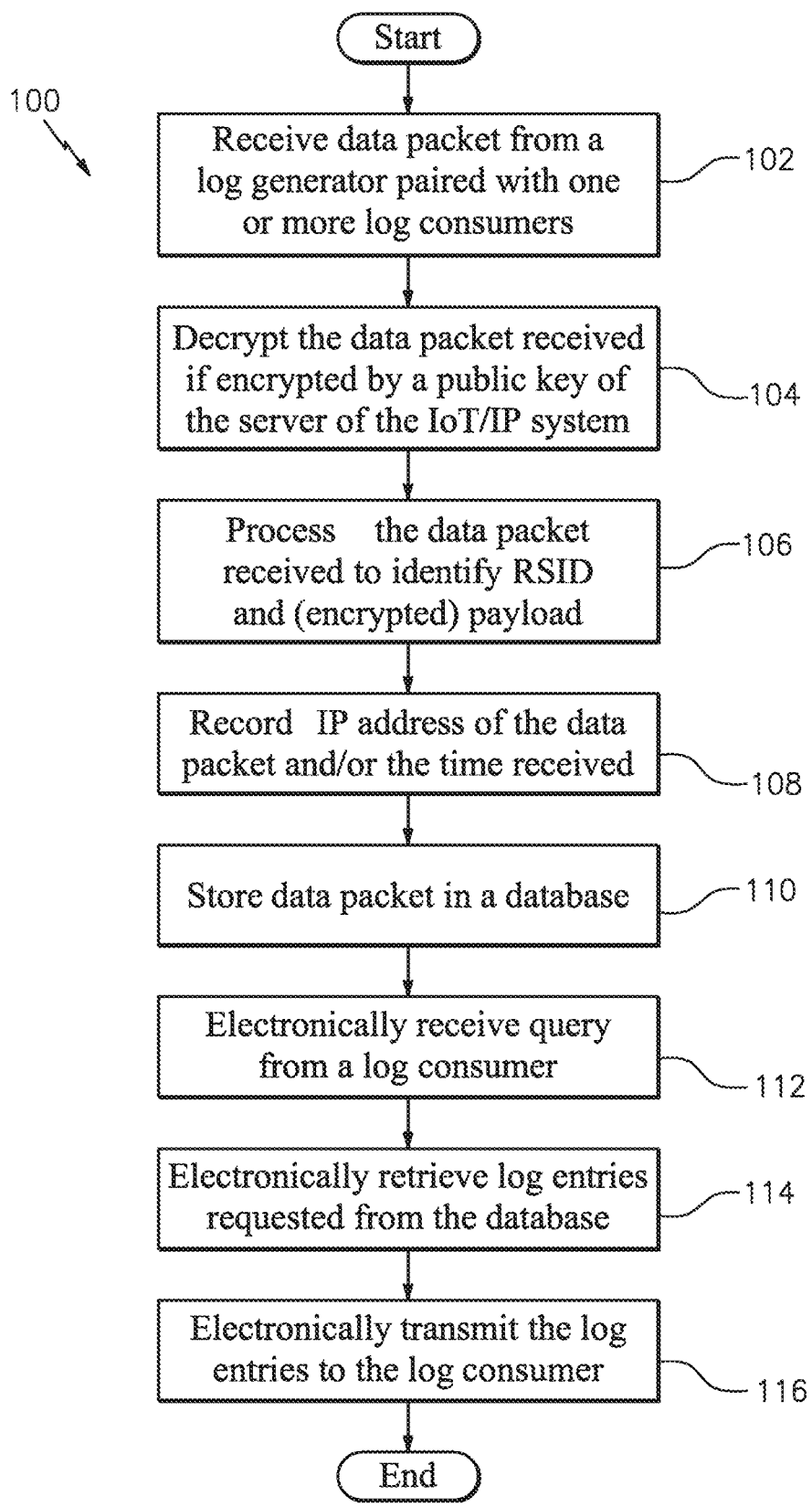
FIG. 7 illustrates processing steps of the secure log storage subsystem of the IoT/IP system.

FIG. 7 illustrates processing steps 100 of a secure log storage subsystem of an exemplary IoT/IP system. In step 102, the IoT/IP system electronically receives over a network a data packet (e.g., message, communication, record, etc.) from a log generator (e.g., first electronic device) paired (e.g., synced) with one or more log consumers (e.g., second electronic devices). The log generator and log consumer are paired such that the devices agree on a Remote Storage identification (RSID) (e.g., linking address). The RSID in various embodiments exists in a very sparse name space and could be a random token, number, a word, a passphrase, a symbol, etc. If an RSID of sufficient complexity (e.g., size, variability, etc.) is used, that specific RSID being used will be impractical to guess or deduce. For example, the RSID may be a token of 128 bits. The log generator and log consumer (e.g., two electronic devices) may be paired together (e.g., and agree on a common RSID) in any of a variety of ways. For example, the two electronic devices could communicate directly with one another (e.g., using BLUETOOTH, WI-FI etc.), the two electronic devices could be packaged and sold together such that the devices have been preprogrammed with the common RSID by the manufacturer, and/or the two electronic devices could be registered with a website which syncs the two devices together. Alternatively, a user could manually enter a RSID in each of the devices and/or manually enter a unique passphrase (e.g., word, sentence, etc.) which is processed by a pre-programmed mathematical algorithm to correlate with a RSID (e.g., the passphrase on each device gets processed by the same algorithm so that each device independently comes up with the same RSID). Additionally, or alternatively, the log generator could create an RSID upfront, use it to store log entries, and subsequently electronically communicate the RSID to one or more log consumers. Any suitable method of electronic communication may be used, such as secure socket layer (SSL), etc. The two electronic devices may also have established credentials (e.g., shared secrets) that enable secure communication over insecure channels. More specifically, such established credentials enable end-to-end encryption between the devices to protect communications from the IoT/IP system and/or anyone else. In this way, the entire data packet may be encrypted by a first encryption having an RSID and a payload encrypted by a second encryption. Thus, the log entries could be stored encrypted, and only authorized log consumers can decrypt them. In step 104, the IoT/IP system decrypts the data packet received if encrypted by a public key of the server of the IoT/IP system. Data packet encryption hides the RSID from observers and prevents interference by third parties (e.g., prevents third parties from learning the RSID). To encrypt the data packet, any of the existing public key schemes can be used (e.g., RSA, Diffie-Hellman (DH) (establishing a one-time shared secret by a public key method), elliptic curve cryptography (ECC), etc). However, as discussed above, the IoT/IP system does not require security associations. Electronic communications from the log generator and/or the log consumer to the IoT/IP system could be encrypted with the public key of the server of the IoT/IP system. In step 106, the IoT/IP system then processes the data packet received to identify the RSID and payload (e.g., encrypted payload), thereby associating the log entry with the RSID. In step 108, the IoT/IP system records the IP address of the data packet and/or the time received (e.g., adds a timestamp to the data packet) in the database. In step 110, the IoT/IP system stores the packet in a database (e.g., a key-value database). Any of a variety of databases could be used. The storage mechanism provides retrieval operation, e.g., the data packet from the database, using only the RSID. Additionally, the storage mechanism may also provide retrieval using the RSID and a timestamp range, deletion of contents associated with RSID, and/or silent log record dropping (e.g., after age and/or capacity per RSID is reached or exceeded). If the payload is encrypted, any of a variety of procedures for securing information at rest could be used. For example, an encrypted payload could include random salt (e.g., Initialization Vector (IV), etc.), payload length, and/or Initialization Vector with log entry (e.g., encrypted by a stream cipher using shared secret as a key).

In step 112, the IoT/IP system electronically receives a query (e.g., request) from a log consumer. The request includes the RSID and may optionally include query terms (e.g., maximum number of latest entries to be retrieved and/or time of oldest entry to retrieve, etc.). The request may be encrypted with the public key of the server of the IoT/IP system. This encryption hides the RSID from observers and prevents interference by third parties (e.g., prevents third parties from learning the RSID). To encrypt the data packet, any of the existing public key schemes can be used (e.g., RSA, Diffie-Hellman (DH) (establishing a one-time shared secret by a public key method), elliptic curve cryptography (ECC), etc). However, as discussed above, the IoT/IP system does not require security associations. Particularly for data packets with end-to-end encryption and authentication with pre-established credentials, securing electronic communication (e.g., traffic) between clients and the IoT/IP system is not required. Encrypting the RSID with the public key of the IoT/IP server and using sparse ID name space ensures that attackers cannot insert malicious traffic or log entries, or pose as legitimate communications peers or consumers, thereby preventing targeted denial of service (DoS) attacks and snooping. In step 114, the IoT/IP system retrieves the log entries requested (e.g., consistent with the query terms) from the database. In step 116, the IoT/IP system electronically transmits the log entries to the log consumer. If encrypted, the log entry (e.g., payload) remains opaque to third parties. The electronic transmission may include a timestamp and/or be encrypted, such as by the IoT/IP system server and log consumer establishing a one-time shared secret by an public key method (e.g., Diffie-Hellman). In this way, the IoT/IP system acts as a storage between the first electronic device and the second electronic device. The IoT/IP system is completely indifferent (e.g., agnostic) as to the identity of the electronic devices (e.g., log generators, log consumers, etc.), the content of the encrypted log entries, the identity of the owner of one or both of the electronic devices, etc. However, because the RSID range is so large, only the agreed upon parties (e.g., the log generator and the log consumer) can deposit and retrieve log entries. Thereby, the IoT/IP system provides the privacy and security necessary for electronic communications over a network. The IoT/IP system (e.g., secure relay communication subsystem, secure log storage subsystem) does not process or store any identifying information about the clients (e.g., electronic devices, owners of electronic devices, etc.). This substantially reduces setup costs, maintenance costs, and data storage requirements. However, as the IoT/IP system does not utilize any identifying information, unrelated parties (e.g., unauthorized users) could attempt to use the IoT/IP system. Accordingly, if desired, to counteract potential abuse or use by unauthorized users (e.g., nonpaying users), each authorized electronic device could be issued a unique blinded certificate. The unique blinded certificate (e.g., bureau document) could be required to be submitted periodically (e.g., with the first log entry, every inactivity timer period, etc.). The unique blinded certificate may be embedded by the manufacturer, issued from online registration, etc. Thus, the IoT/IP system could recognize a valid certificate, but does not associate it with a particular electronic device and/or user. The IoT/IP system may, in some embodiments, monitor for signs of abuse and could blacklist (e.g., ban) any certificates and/or IP addresses found to cause abuse, thereby preventing the IP address or certificate holder from accessing the IoT/IP system. Such signs of abuse could include access to a particular RCID by an IP address where the IP address changes too frequently, or concurrent use of a particular RSID by two devices with the same certificate but different IP addresses, or a third electronic device attempting to use a particular RCID, etc.

Using sparse ID (e.g., linking address, RSID, RCID) name space provides very efficient client-side load balancing and high availability. Assuming N log servers (which do not need to be connected), each client (e.g., generator, consumer, Client A, Client B, etc.) has a list of addresses of all active servers (e.g., Server[N]). To select a server, a client (e.g., generator, consumer, Client A, Client B, etc.) calculates index i=ID mod N (where ID is either RCID or RSID), and selects Server[i]. At least in embodiments where ID is randomly chosen, the load will be evenly distributed over N log servers without any additional procedures. Instead of using ID directly, a hash of ID (e.g., i=hash(ID) mod N) may be used to avoid consequences of potential poor randomness of ID.

Using a hash of the ID can also be used to work around failed log servers. For example, if a log server fails to respond to certain packets as expected (e.g., a response does not arrive), the generator or consumer simply increment RSID by one, and calculate new i=hash(RSID) mod N again, until the server responds.

Figure 8:
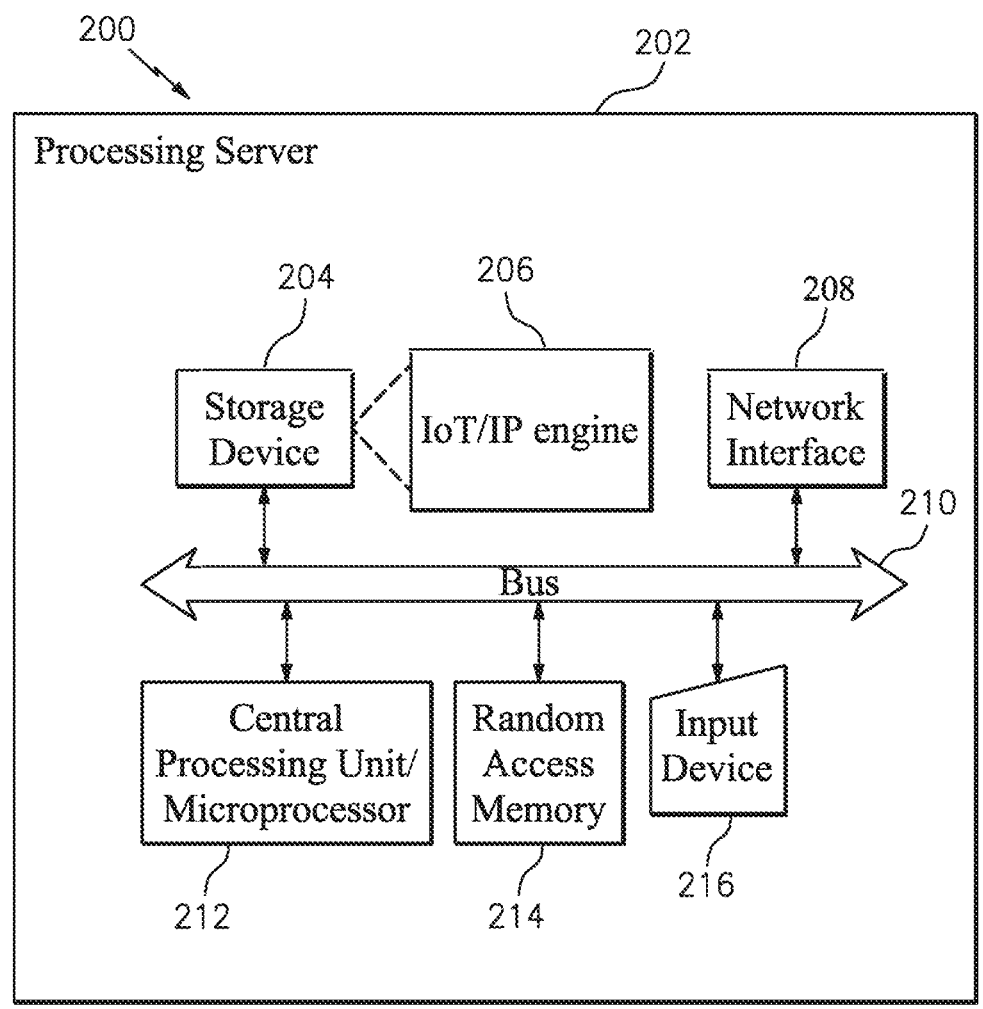
FIG. 8 is a diagram showing hardware and software components of the system.

FIG. 8 is a diagram showing hardware and software components of an exemplary IoT/IP system 200. The system 200 comprises a processing server 202 which may include one or more of a storage device 204, a network interface 208, a communications bus 210, a central processing unit (CPU) (microprocessor) 212, a random access memory (RAM) 214, and one or more input devices 216, such as a keyboard, mouse, etc. The server 202 may also include a display (e.g., liquid crystal display (LCD), cathode ray tube (CRT), etc.). The storage device 204 may comprise any suitable, computer-readable storage medium such as disk, non-volatile memory (e.g., read-only memory (ROM), erasable programmable ROM (EPROM), electrically-erasable programmable ROM (EEPROM), flash memory, field-programmable gate array (FPGA), etc.). The server 202 may be a networked computer system, a personal computer, a smart phone, tablet computer etc. The functionality provided by the present disclosure may be provided by an IoT/IP program/engine 206, which may be embodied as computer-readable program code stored on the storage device 204 and executed by the CPU 212 using any suitable, high or low level computing language, such as Python, JAVA, C, C++, C#, .NET, MATLAB, etc. The network interface 208 may include an Ethernet network interface device, a wireless network interface device, or any other suitable device that permits the server 202 to communicate via the network. The CPU 212 may include any suitable single- or multiple-core microprocessor of any suitable architecture that is capable of implementing and running the IoT/IP engine 206 (e.g., INTEL processor). The random access memory 214 may include any suitable, high-speed, random access memory typical of most modern computers, such as dynamic RAM (DRAM), etc.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. An Internet-of-Things (IoT)/Internet Protocol (IP) system for secure communication, the IoT/IP system comprising:
   a first electronic device;
   a second electronic device, wherein the second electronic device is configured to pair with the first electronic device and the first electronic device and the second electronic device are configured to agree upon an identifier during pairing;
   a server in electronic communication over a network with the first and second electronic devices; and
   an engine stored on and executed by the server, the engine configured and adapted for:
      electronically receiving data packets over the network from the first electronic device;
      decrypting the data packets when the data packets are encrypted by a public key of the server;
      processing the data packets to identify the agreed upon identifier and a payload contained therein;
      storing the data packets and the agreed upon identifier in a database of the IoT/IP system as a log entry, wherein the log entry does not include any identifying information associated with the first electronic device apart from the agreed upon identifier;
      electronically receiving a query from the second electronic device, the query including the agreed upon identifier;
      electronically retrieving one or more log entries from the database based on parameters of the query including the agreed upon identifier; and
      electronically transmitting the one or more log entries to the second electronic device.

2. The IoT/IP system of claim 1, wherein the first electronic device is configured to send data packets to the second electronic device using the agreed upon identifier and the second electronic device is configured to send data packets to the first electronic device using the agreed upon identifier.

3. The IoT/IP system of claim 1, wherein the agreed upon identifier includes a token having at least 128 bits.

4. The IoT/IP system of claim 1, wherein the entire data packets are encrypted by a first encryption and the payload is encrypted by a second encryption.

5. The IoT/IP system of claim 1, wherein parameters of the query include at least one of a maximum number of latest log entries to be retrieved or a time stamp of an oldest log entry to be retrieved.

6. The IoT/IP system of claim 1, wherein the log entries are stored on the server.

7. The IoT/IP system of claim 1, wherein the engine does not process any identifying information about the first electronic device.

8. The IoT/IP system of claim 1, wherein the first electronic device is issued a unique blinded certificate for authorized communication within the IoT/IP system.

9. The IoT/IP system of claim 1, wherein the first electronic device includes a transmitter and a processor;
   wherein the first electronic device is configured to use a first communication protocol to communicate with the second electronic device and establish a secured communication pathway with the second electronic device to agree upon the identifier;
   wherein the first electronic device is configured to use a second communication protocol to communicate with the second electronic device via the server using the agreed upon identifier;
   wherein the data packets include first data packets and second data packets and the first electronic device is configured to send the first data packets via the second communication protocol, wherein the first data packets correspond to a status detected by the processor; and
   wherein the first electronic device is configured to send the second data packets via the second communication protocol, wherein the second data packets communicate a real time alert detected by the processor.

10. The IoT/IP system of claim 9, wherein the secured communication pathway does not process any identifying information about the first electronic device or the second electronic device.

11. The IoT/IP system of claim 9, wherein the first communication protocol is a local communication protocol, and wherein the second communication protocol includes remotely communicating over the internet.

12. A method for secure communication, comprising:
   pairing a first electronic device with a second electronic device;
   establishing an agreed upon identifier between the first electronic device and the second electronic device while paired;
   electronically receiving, at an engine stored on and executed by a computer system of an Internet-of-Things/Internet Protocol (IoT/IP) system, a data packet from the first electronic device over a network;
   decrypting the data packet when the data packet is encrypted by a public key;
   processing the data packet to identify the agreed upon identifier and a payload contained therein;
   storing the data packet and the agreed upon identifier in a database of the IoT/IP system as a log entry, wherein the log entry does not include any identifying information associated with the first electronic device apart from the agreed upon identifier;
   electronically receiving a query from the second electronic device, the query containing the agreed upon identifier;
   electronically retrieving one or more log entries from the database based on parameters of the query including the agreed upon identifier; and
   electronically transmitting the one or more log entries to the second electronic device.

13. The method of claim 12, wherein the first electronic device is paired with the second electronic device using a local communication protocol.

14. The method of claim 12, wherein the agreed upon identifier is a token having at least 128 bits.

15. The method of claim 12, wherein the identifier includes a random token, a number, a word, a passphrase, and a symbol.

16. The method of claim 12, wherein the entire data packet is encrypted by a first encryption and the payload is encrypted by a second encryption.

17. The method of claim 12, wherein parameters of the query include at least one of a maximum number of latest log entries to be retrieved or a time stamp of an oldest log entry to be retrieved.

18. The method of claim 12, wherein the database does not store any identifying information about the first second electronic device.

19. The method of claim 12, wherein the engine does not process any identifying information associated with the first electronic device.

20. The method of claim 12, wherein the first electronic device is issued a unique blinded certificate for authorized communication within the IoT/IP system.

\* \* \* \* \*